United States Patent [19]

Chrobak

[11] Patent Number: 5,743,316

[45] Date of Patent: Apr. 28, 1998

[54] DYNAMIC STEERABLE WHEEL SPRING

[75] Inventor: Dennis S. Chrobak, Silver Lake, Ohio

[73] Assignee: American Mobility Systems, Inc., Boulder City, Nev.

[21] Appl. No.: 398,422

[22] Filed: Mar. 2, 1995

[51] Int. Cl.$^6$ ............................................. B60B 9/04
[52] U.S. Cl. ................................. 152/12; 152/11
[58] Field of Search ................................. 152/1, 5, 6, 7, 152/11, 12, 69, 80, 81, 85, 86

[56] References Cited

U.S. PATENT DOCUMENTS

| | | | |
|---|---|---|---|
| 812,227 | 2/1906 | Peust | 152/11 |
| 836,578 | 11/1906 | De Hora | 152/11 X |
| 1,167,757 | 1/1916 | Hess | 152/11 |
| 1,470,048 | 10/1923 | Barker . | |
| 1,639,827 | 8/1927 | Wayne | 152/12 |
| 3,607,497 | 9/1971 | Chrobak . | |
| 3,751,551 | 8/1973 | McGillvary . | |
| 3,961,657 | 6/1976 | Chrobak . | |
| 3,989,083 | 11/1976 | Chrobak . | |
| 4,379,104 | 4/1983 | Koorevaar . | |
| 4,436,128 | 3/1984 | Pointer . | |
| 4,472,340 | 9/1984 | Boden et al. . | |
| 4,588,542 | 5/1986 | Pierce . | |
| 4,705,087 | 11/1987 | Markow | 152/12 X |
| 4,855,096 | 8/1989 | Panaroni et al. . | |
| 4,867,217 | 9/1989 | Zaurent | 152/12 X |
| 4,936,365 | 6/1990 | Chrobak . | |
| 4,943,223 | 7/1990 | Panaroni . | |
| 5,050,656 | 9/1991 | Ho | 152/11 |
| 5,086,815 | 2/1992 | Panaroni et al. . | |
| 5,353,853 | 10/1994 | Hansson | 152/11 |

FOREIGN PATENT DOCUMENTS 3807 of 1914 United Kingdom ............... 152/11

OTHER PUBLICATIONS

Automotive Engineering, Nov. 11, 1990 "Non-pneumatic tire technology" pp. 29–33.
Tire Science & Technology "Design and Analysis of a Composite Integral Wheel–Tire" pp. 138–153 1990.
R.J. Gartland, Jun. 12, 1978 "Feasibility Study Integral Tire/Wheel Unit" Parts I and II.
SAE Technical Paper Series Feb. 27–Mar. 7, 1984 "Typical Vehicle Parmaters for Dynamics Studies Revised for the 1980's" Riede, Leffert, Cobb.
"Extended Mobility for Pneumatic Wheeled Vehicles" Dudley, Abbott & Fleming Apr. 22, 1993.
"Run–Flat Tire and Wheel System" Hara Apr. 22, 1993.
"A Deflation Warning System for Passenger Car Tires" Major, Dunlop Tire Corporation.
"Michelin's Contribution to Safety Through Leading–Edge Technology" Menendes Apr. 22, 1993.

(List continued on next page.)

*Primary Examiner*—Russell D. Stormer
*Attorney, Agent, or Firm*—M. Reid Russell

[57] ABSTRACT

A dynamic steerable spring for axially mounting for supporting a compressive load as it would experience as a vehicle wheel, the load from such vehicle being distributed being evenly transferred to a spring hub, as a replacement for a conventional pneumatic or non pneumatic tire. The spring is preferably manufactured from a single flat sheet of a spring steel type material that is formed into a circular disk that is cut by identical equally spaced radial slots from the disk circumference to a radial distance from the disk center, that is the spring hub wherethrough radially spaced lug bolt holes are formed, with the disk elements between the slots being identical and each terminating in essentially a rectangular end portion. The flat disk is fitted between opposing male and female dies, or the like, that are moved together to bend the disk into the spring where the elements, spaced at equal distances from the hub and bent outwardly from the hub plane, and are then curved to where the finger portions extend across the hub plane. A pair of springs can be joined at the hubs, with the lug holes aligning and the finger end portions interdigitating to form a dual steerable spring. The single or dual spring can receive one or more non-elastic hoops fitted over and under the fingers, and the spring fingers can receive an elastomeric cap formed therearound, and an elastomeric side can be formed around the elements above the hub to form the wheel.

26 Claims, 13 Drawing Sheets

OTHER PUBLICATIONS

"Finite Element Analysis of CCTHS-8, 8B Tires" Goldstein, Parnell Aug. 30, 1983.

The Goodyear Tire and Rubber Company/Central Development Tire Specification.

Plastics Engineering, Apr. 1992 "Back to Basics is Necessary for Viable FEA Modeling" pp. 29–33.

1992 Environmental Management Forum "Partnership in Recycling—A Necessary Part of the Solution" May 6, 1992.

Technical Materials, Inc. "Designing With TMI Multigauge Metal Strip".

New Scandinavian Technology, vol. 5, No. 1, 1993 "The Wheel Re–Invented".

DYNAMIC STEERABLE WHEEL SPRING

BACKGROUND OF THE INVENTION

1. Field of the Invention

A non-pneumatic wheel replacement assembly and method for its manufacture for replacement of a tire/rim assembly for wheeled vehicles.

2. Prior Art

The present inventor has been involved with and is the inventor of a number of pneumatic tire designs and their methods of manufacture, with U.S. Pat. Nos. 3,607,497; 3,961,657; 3,989,083; and 4,936,365 being examples of some of his developments. These inventions are directed to rubber pneumatic tires and essentially deal with casing, tread and side wall design and methods of construction, and are unlike the present invention that is a radical non-rubber, non-pnuematic departure from earlier rim and wheel construction.

In recent times the development and construction of combination non-pneumatic rim and wheel configurations have been undertaken looking for a replacement from conventional pneumatic rubber tires that are mounted onto metal rims. Such non-pneumatic technology has produced, for spare tires, a combination cast polyurethane tire body with a rubber tread, and spin cast polyurethane tires where, in the spinning, a non porous outer tread or skin is formed with the material becoming increasingly porous downwardly from the tread. Such tire and processes for its manufacture are illustrated in U.S. Pat. Nos. 4,855,096 and 5,086,815 to Panaroni, et al.; U.S. Pat. No. 3,751,551 to McGillvary; and U.S. Pat. No. 4,472,340 to Boden, et al., and other composite tire/wheel developments, such as the Panaroni Patent, U.S. Pat. No. 4,943,223. The present invention is not an off shoot of a tension pneumatic or tensioned hoop non-pneumatic tire arrangement, but rather is a new innovation in spring design that is formed to function as an anisotropic assembly that is capable of carrying a load in compression.

SUMMARY OF THE INVENTION

It is a principal object of the present invention in a dynamic steerable spring to provide a wheel type assembly for axial mounting to a vehicle for carrying a compressive load that may be a single or dual anisotropic design and is shaped to provide spaced elements bent inwardly from a side as flexing load bearing members.

Another object of the present invention in a dynamic steerable spring is to provide for manufacturing a single anisotropic assembly from a flat spring steel blank that has been cut by radial slots emanating from a hub area into elements, which flat blank is pressed between die halves in a single operation bending the blank to form an anisotropic assembly.

Another object of the present invention in a dynamic steerable spring is to provide a dual anisotropic assembly formed from a pair of opposing single anisotropic assemblies secured together at their hubs with the elements of each interdigitating forming an elastomeric cap.

Still another object of the present invention in a dynamic steerable spring is to provide a compressive load supporting assembly for axial mounting that can be of a single or dual anisotropic design capable of performing a load supporting function as the assembly is rolled, or can receive a cap of an elastomer or composite material applied thereto.

Still another object of the present invention in a dynamic steerable spring is to provide a compressive load supporting assembly where the cap and side are formed of an elastomer or composite material molded thereto.

Still another object of the present invention in a dynamic steerable spring is to provide a non-pneumatic compressive load supporting assembly capable of safely supporting compressive loads as a wheeled vehicle experiences in traveling over improved and unimproved roads.

The present invention in a dynamic steerable spring for axially mounting to a vehicle to support it during travel. Each spring is preferably formed from a narrow round flat spring steel blank that is preferably holed through the center thereof for coupling onto an axle. The blank is cut so as to remove spaced narrow triangular sections at radial intervals around the hub that extend to the blank circumference. The prepared blank is fitted between male and female dies that are arranged to be pressed together. The opposing surfaced of the dies are formed to provide for bending the blank between the hub and outer edge to form the assembly side and to bend outer sections or fingers thereof inwardly, at essentially right angles, and parallel to one another around the assembly circumference, forming the assembly elastomeric cap.

A blank formed, as set out above, is pressed between dies to form a single anisotropic assembly that, when axially mounted, can carry a compressive load. In that load carrying, the individual fingers tend to flex towards the hub as they roll over an object, and will return to their original state after they have passed over such object. A single anisotropic assembly is a minimum embodiment of the invention. However, to provide a higher integrity balanced assembly where loads directed into either side have the same effect on wheel cushioning, the invention can utilized a pair of anisotropic assemblies that face each other such that the elements interdigitate and are parallel to one another around the assembly circumference and with the hubs aligned and joined together.

Both the single and dual anisotropic wheels of the invention can receive a tread or elastomeric cap formed of an elastomer or composite or elastomer and composite material secured over or over and under the fingers. Also, utilizing injection molding, roto casting, or other method, the single or dual anisotropic wheel can receive sides and a cap of elastomer, composite, or elastomer and compose materials secured thereover and, as desired, can provide for encapsulating the anisotropic spring or springs to form an assembly having an appearance of a combined hub and tire.

DESCRIPTION OF THE DRAWINGS

In the drawings that illustrate that which is presently regarded as the best modes for carrying out the invention.

DETAILED DESCRIPTION

Figure 2:
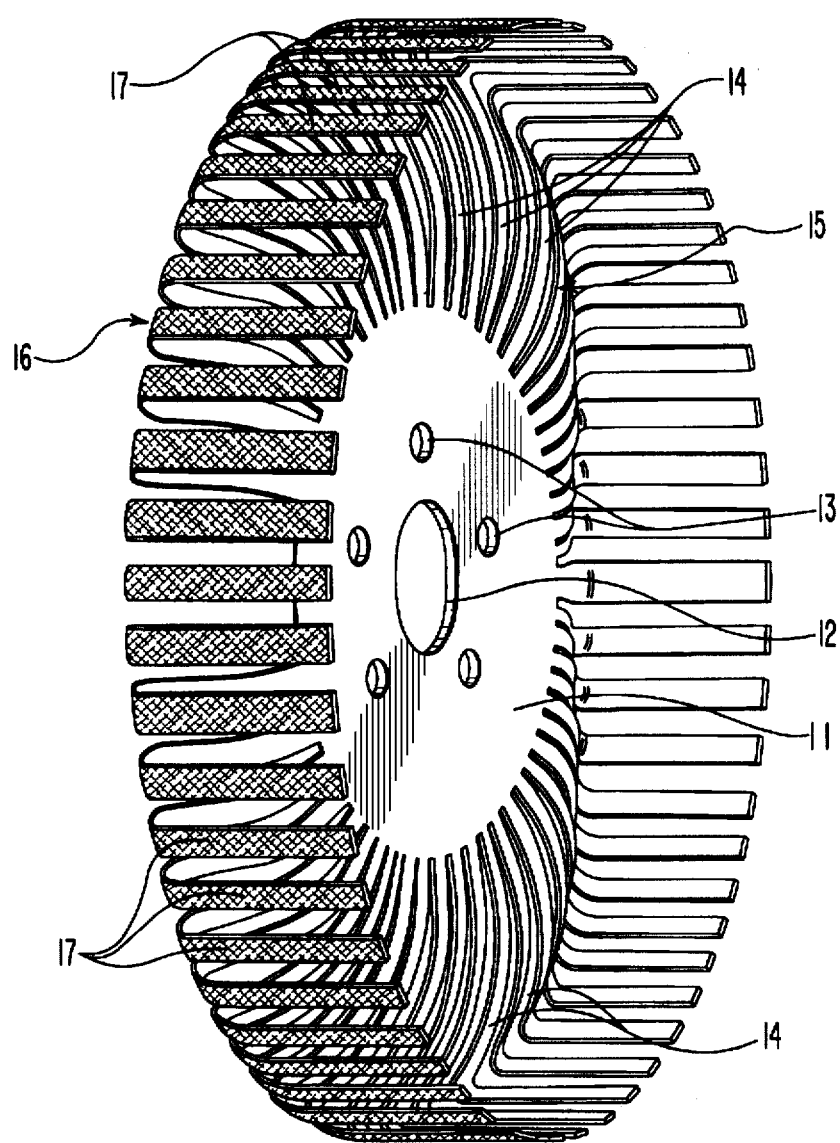
FIG. 2 is a profile perspective view of the single anisotropic spring of FIG. 1 with the resilient material removed.
Figure 18:
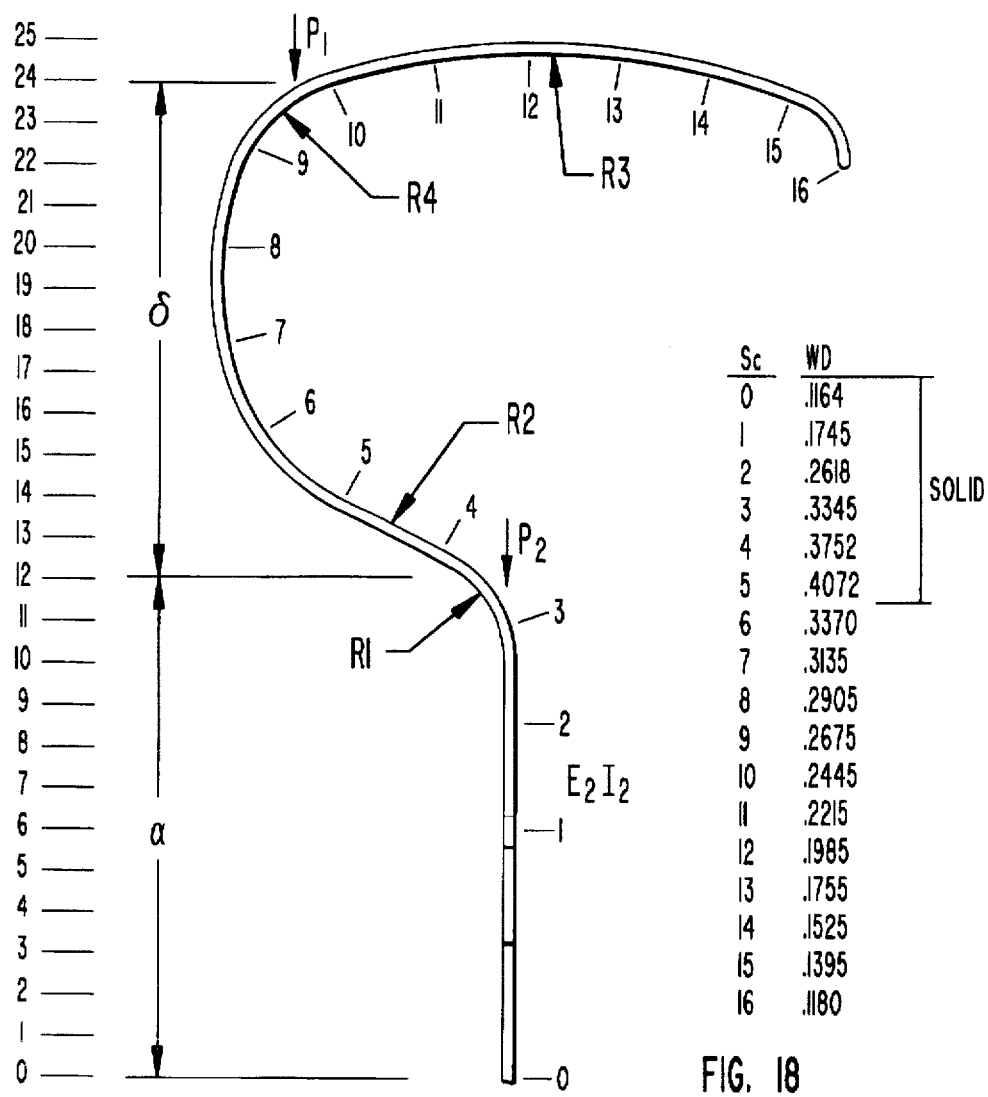
FIG. 18 is a single anisotropic assembly marked off in equal segments that indicate an actual size of a half of the assembly, and showing a relationship thereto of critical radiuses to provide optimum curves of the assembly segments from the hub and across the side to the finger elements thereof and relating the assembly dimensions to a formula for determining critical load.

FIG. 2 shows a single anisotropic spring 10 of the invention that includes a hub 11 that has had a center hole 12 formed therethrough. A plurality of equal spaced radial hub stud holes 13 are also formed through the hub that are each for receiving a lug bolt fitted therethrough, not shown. Equally spaced elements 14 extend radially outwardly from the plane of the hub and, as shown, may slope slightly outwardly from the hub plane. The elements 14 are shown as curved outwardly at their top portions. The amount of which curve is determined by a first radius R1, as shown in FIG. 18, located a distance from the front of the spring 10. That portion of the spring 10 between the hub area 11 and a top portion is an assembly body 15. An assembly outer portion 16 is shown as formed as a curve from by a second radius R2 that is shown within the spring. The wheel body 16 width is determined by the junctions of the ends of the second radius R2 and a third radius R3 that is also located within the spring, as well as a fourth radius R4 that is located at shoulder area and provides for stress transition.

End section or fingers 17 of the elements 14, from a top end of the curve of radius R3, are preferably essentially straight, but may be slightly curved downwardly proximate to their ends. The fingers 17 extend essentially across the plane of the hub and form the assembly elastomer cap. The fingers 17 are compression support elements for flexing inwardly during rolling when supporting a compressive load, and will flex outwardly, returning to their original shape, when the compressive load is removed.

Figure 1:
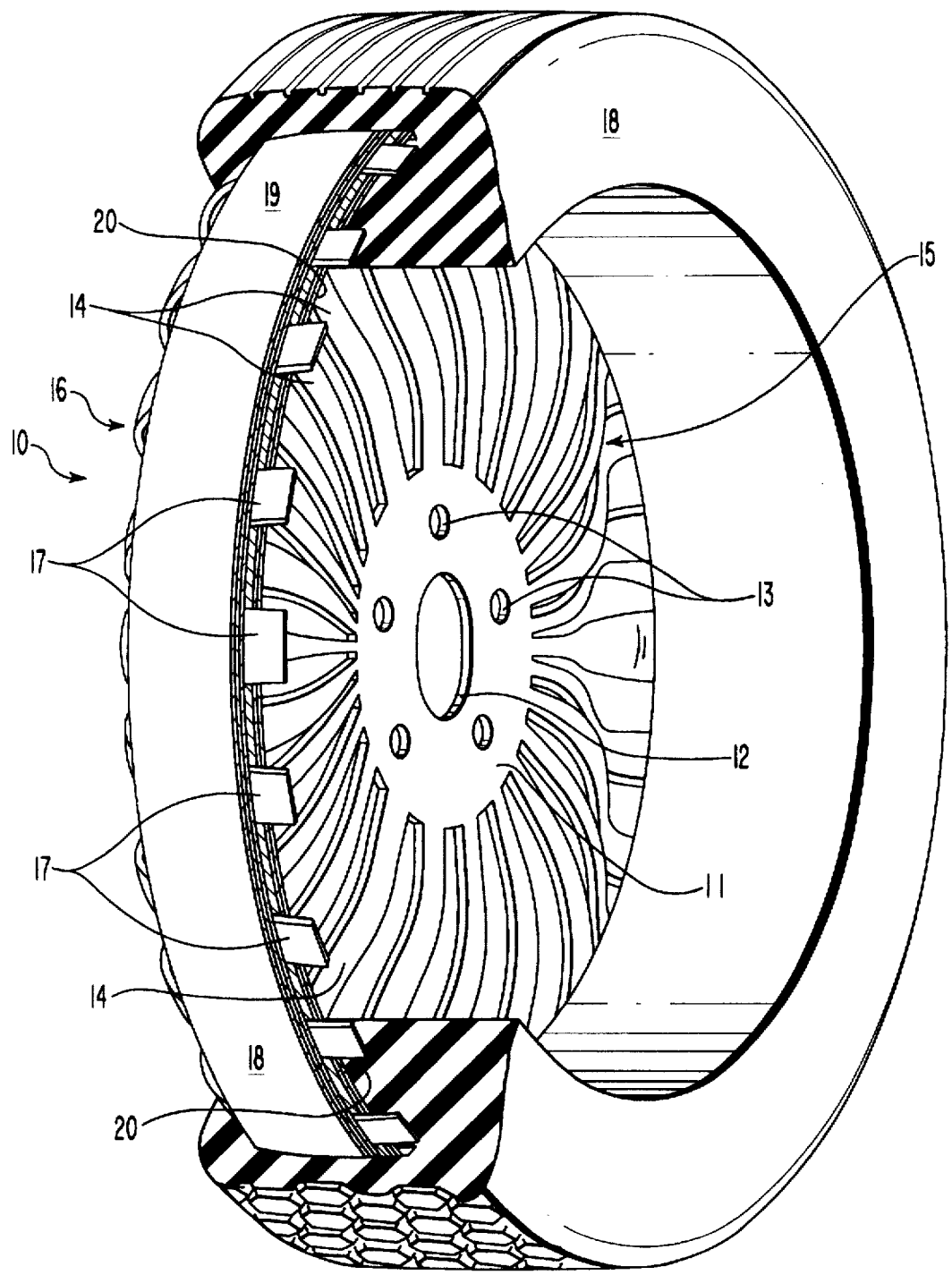
FIG. 1 is a profile perspective view of a single anisotropic spring of the invention formed into an assembly that has had a section removed to expose hoops fitted over and under finger elements and beneath an elastomer cap formed of a resilient material.

FIG. 1 shows the single anisotropic spring 10 with a cap 18 formed over and around the fingers 17, and showing a section of the cap removed to expose the assembly elements encapsulated within the cap. The cap 18 is formed to have a top or upper surface that is appropriate for the assembly's function, and may be formed of an elastomer or plastic material that should be an ultra high traction material. The material is, preferably, a foam polymer and may be a polyether urethane, synthetic or natural rubber or combination thereof. For this application a combination type material is preferred that contains approximately fifty percent (50%) to seventy-five percent (75%) by weight of ground rubber mixed in a urethane and can be formed into the cap 18 as shown. Such material can be utilized as both a cap and side for an assembly and may be formed around the assembly by injection molding or roto casting methods within the scope of this disclosure. Prior to which casing a top hoop or hoops 19 and, optimally, a bottom hoop or hoops 20 can be fitted thereto as diameter stabilizers. Which hoops are preferably formed from a material such as nylon that may be coated with a polyether urethane material, or the like, but may by another suitable inelastic material or materials, within the scope of this disclosure.

Figure 3:
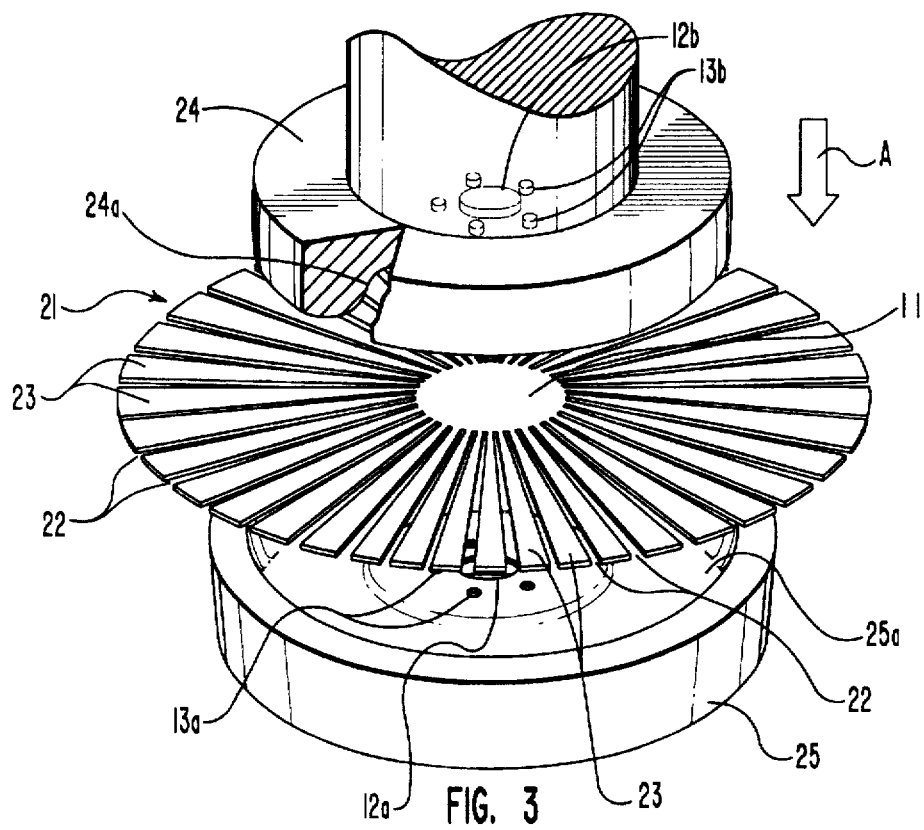
FIG. 3 shows a flat round metal blank wherein identical spaced thin triangular radial slots have been removed from around a circular hub wherein spaced holes have been formed, with the blank shown fitted between male and female dies that, as indicated by an arrow A, are being moved together.
Figure 4:
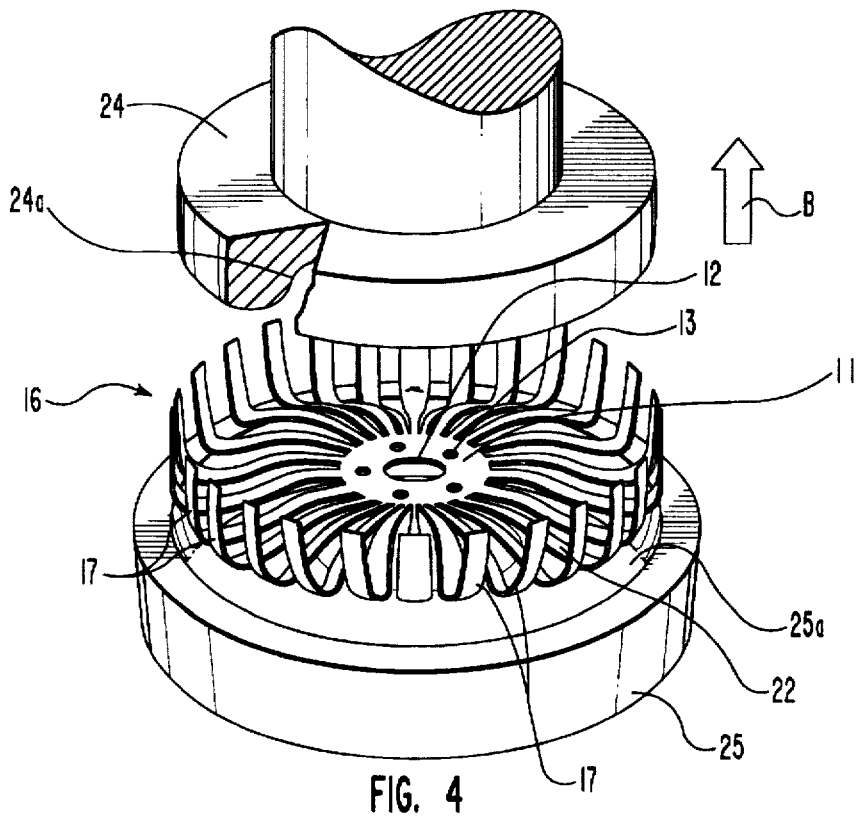
FIG. 4 shows a view like that of FIG. 3 after, as shown by an arrow B, the dies have been moved apart and showing the blank having been bent into a single anisotropic assembly.

To form the single anisotropic spring 10, as shown in FIGS. 3 and 4, a thin flat blank 21 wherefrom the single spring 10 is formed is positioned within a press shown as including top and bottom dies 24 and 25. The blank 21 is preferably formed from a metal and has a circular outer edge with a center circular hub 11 wherethrough center hole 12 and lug holes 13 have been formed. Which center and lug holes, it should be understood, could otherwise be formed, as by punching, burning, drilling, or by another method, during formation of the spring 10, as set out below. The blank 21, as shown, will have had a number of identical spaced radial slots 22 formed therein extending from the hub outer edge to the circular blank outer edge, leaving identical segments 23. The identical slots 22 form the segments 23 such that, with the blank bent, as shown in FIG. 4, the segment ends form fingers 17 that each have an identical essentially rectangular shape.

To form the blank 21 into the single anisotropic spring 10 the male and female dies 24 and 25 are moved together, as illustrated by arrow A in FIG. 3, to press the blank into the shape of the opposing cavities 24a and 25a that are formed in the opposing faces of which dies. Whereafter, the dies 24 and 25 are moved apart, as illustrated by arrow B in FIGS. 4, and the single anisotropic spring 10 is removed therefrom.

Figure 5:
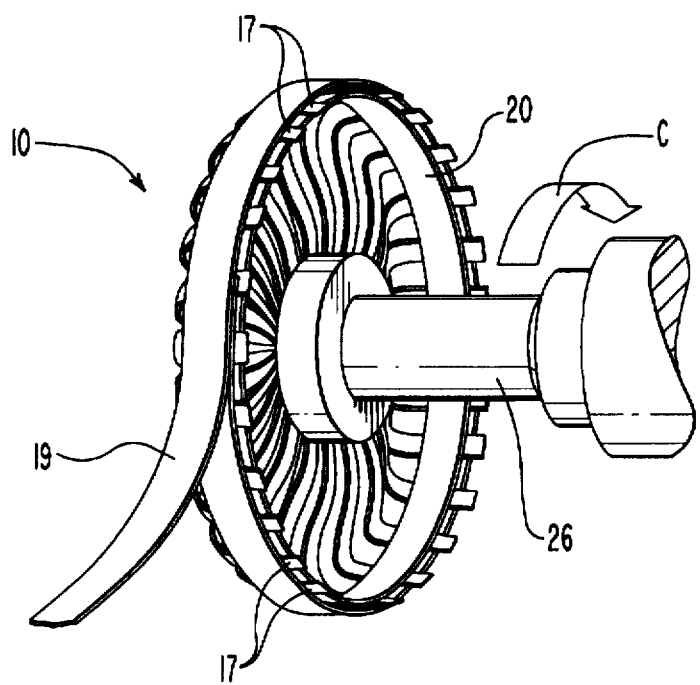
FIG. 5 shows a hoop being rolled onto fingers, indicated by arrow C, which fingers also receive a hoop fitted thereunder of the single anisotropic wheel of FIG. 4.

FIG. 5 shows the single anisotropic spring 10 hub mounted onto an end of a shaft 26 that is turned, as illustrated by arrow C, to wind the top hoop 19 onto the fingers 17. Also, a bottom hoop 20 that is shown as having been formed into a circular hoop is aligned for installation under the elements 17. In practice the top hoop 19 could also be formed separately and slid over the fingers 17, or the top and bottom hoops could be otherwise fitted over and under the fingers 17, within the scope of this disclosure. Further, a top hoop 19 or a bottom hoop 20 alone could be fitted over or under the fingers 17, as desired, within the scope of this disclosure.

Figure 6:
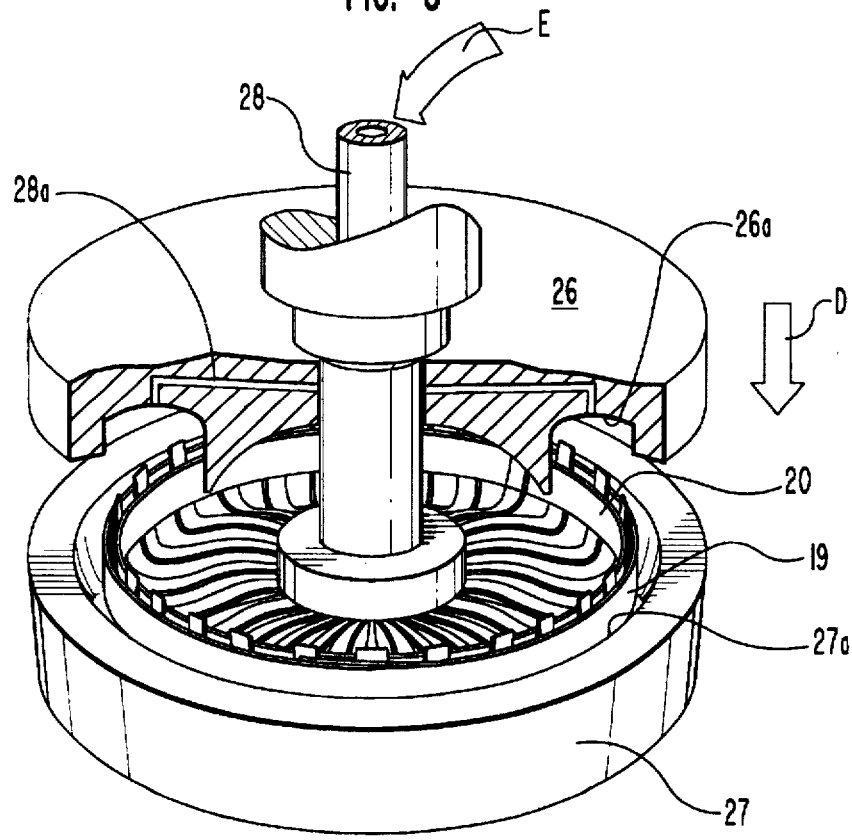
FIG. 6 shows the single anisotropic assembly with the hoops rolled and fitted thereon of FIG. 5 positioned in a bottom mold half with a top mold, shown by an arrow D, being lowered closed thereover and illustrating with an arrow E an injection of a composite material into the closed mold.

To form an elastomeric coating onto the spring 10, or portions thereof, FIG. 6 shows top and bottom mold sections 26 and 27 respectively, that have opposing cavities 26a and 27a respectively. The lower or bottom mold section cavity 27a is shown with the single anisotropic spring 10 of FIG. 5, fitted therein. The mold is then closed, as illustrated by arrow D, and a composite material is passed therein through a nozzle 28, as illustrated by arrow E. While the mold shown in FIG. 6 is an injection mold it should be understood that such mold may be arranged for roto casting, or can be arranged to utilize other techniques as are suitable for applying an elastomer cap with, or without a side onto the spring 10 within the scope of this disclosure. Also, while a single anisotropic spring 10 is shown in FIG. 6, it should be understood that the mold could be arranged to receive and cast a dual anisotropic spring within the scope of this disclosure.

Figure 7:
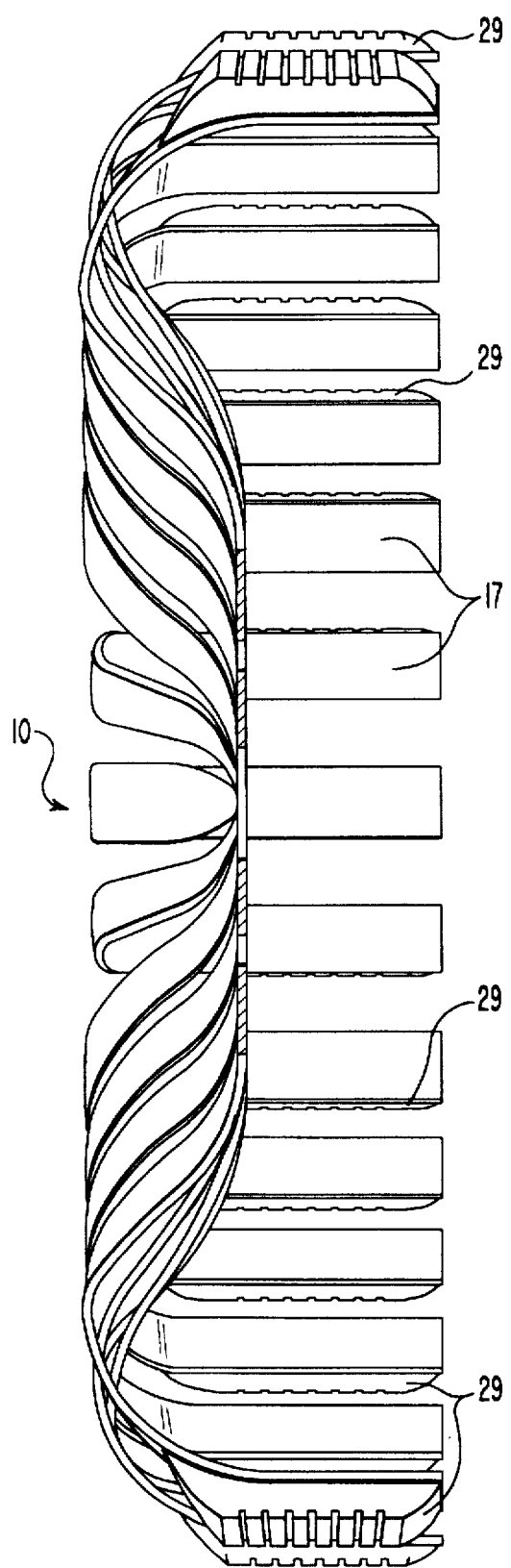
FIG. 7 shows the single anisotropic assembly of FIG. 2 showing sections of cap secured onto the individual finger elements thereof.

FIG. 7 shows the single anisotropic spring 10 as having sections of tread 29 fixed to the outer surfaces of fingers 17. FIG. 7 illustrates that the spring 10 is capable of being used alone to support compressive loads as are associated with its use when axially mounted as a wheel supporting a vehicle. For such use, the cap sections 29 can be included for providing traction only and would not support or contain the spring.

Figure 8:
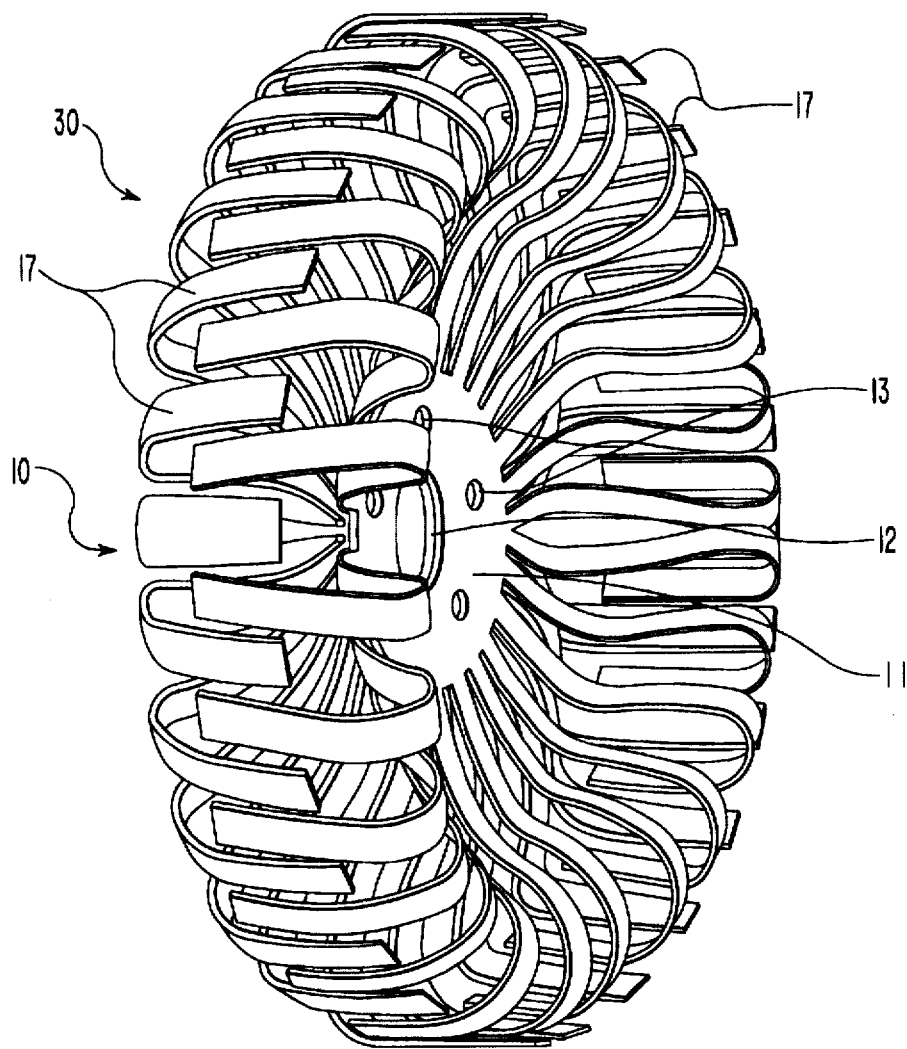
FIG. 8 is a profile perspective view of the dual anisotropic assembly of the invention.
Figure 11:
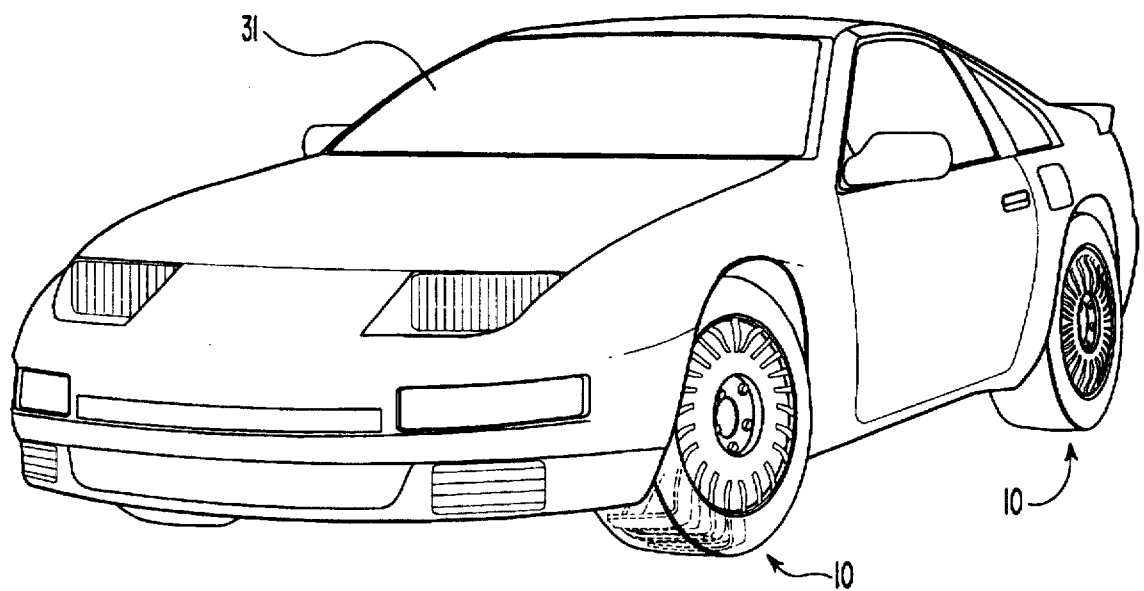
FIG. 11 shows a front elevation perspective view of a conventional automobile supported on anisotropic assemblies of the invention.
Figure 12:
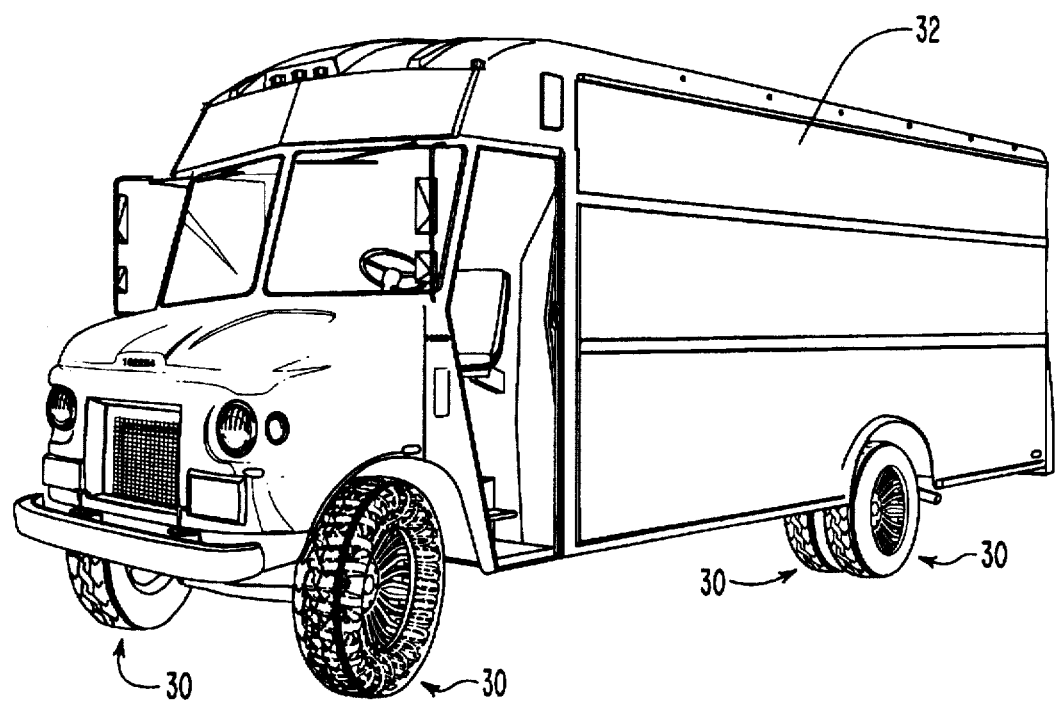
FIG. 12 is a view like that of FIG. 11 only showing a conventional truck type vehicle supported on anisotropic assemblies of the invention.

FIG. 8 shows a dual anisotropic spring 30 formed by joining, at their hubs, two single anisotropic springs 10 such that the fingers 17 nest or interdigitate with one another. The dual anisotropic spring 30 can receive an elastomeric cap of a composite material formed thereon as by molding, roto casting, or other method, as described with respect to the single anisotropic spring 10. A wheel is thereby formed for axial mounting to support a compressive load. Which arrangement, it should be understood is capable of supporting a greater compressive load than can be applied to an assembly formed of the single anisotropic spring 10. For example, FIG. 11 illustrates an axial mounting of wheels formed from single anisotropic springs 10 of the invention, shown in broken lines, supporting a conventional automobile 31. Whereas, a heavier truck type vehicle 32 is shown in FIG. 12 supported on wheels formed from dual anisotropic springs 30, shown in broken lines.

Figure 9:
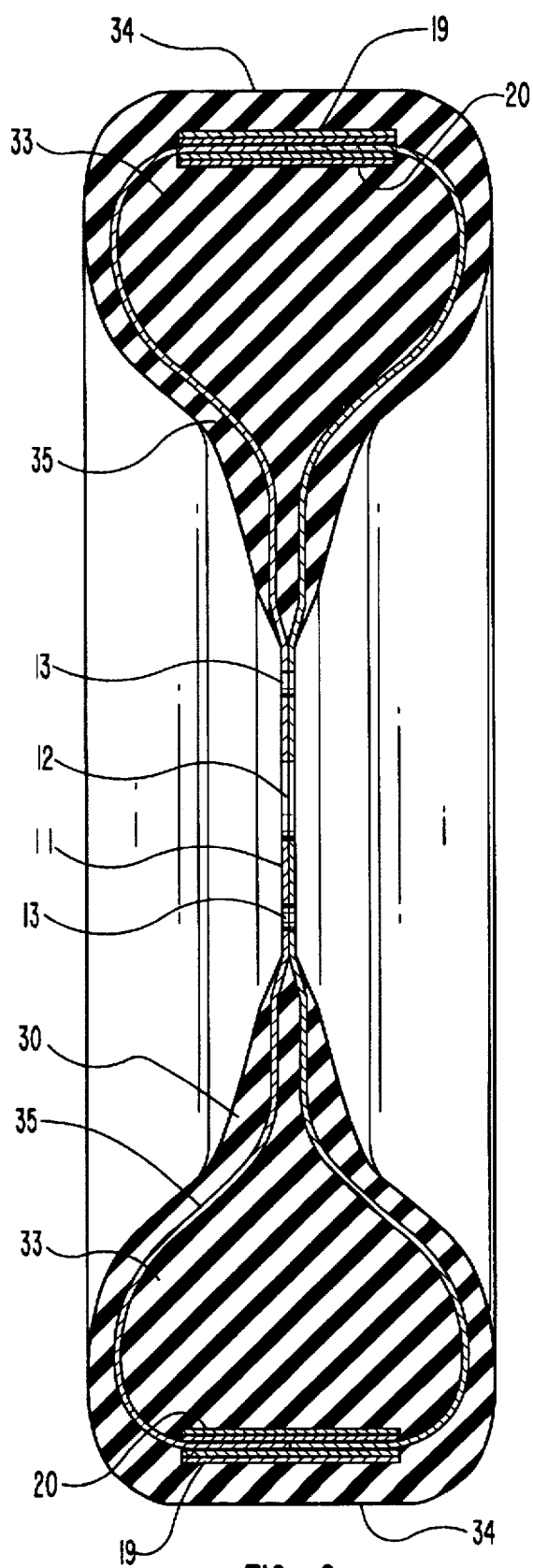
FIG. 9 is a cross section of a dual anisotropic assembly of the invention arranged as the core of a molded composite non pneumatic tire and rim.
Figure 10:
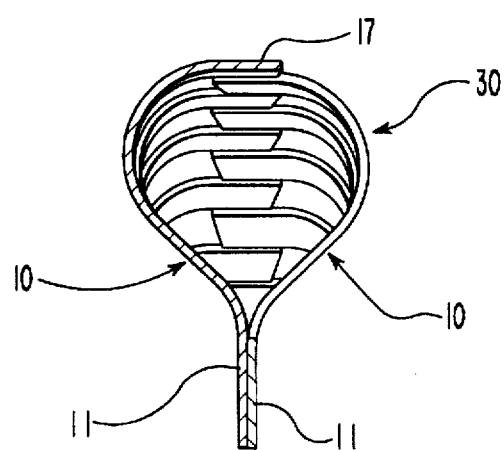
FIG. 10 is a reduced view of cross section of a pair of opposing single anisotropic assembles joined at their hubs into the dual anisotropic assembly of FIG. 9.

FIG. 9 shows the dual anisotropic spring 30 of the invention with top and bottom hoops 19 and 20, respectively, with the assembly contained within a composite material 33 molded therearound to form the assembly elastomeric cap 34 and sides 35. Which assembly includes the hub 11 with a center hole 12 and lug holes 13 formed therethrough for axial mounting to a vehicle like the vehicle of FIG. 12. FIG. 10 shows the pair of single anisotropic springs 10 fitted together into the dual anisotropic spring 30 with the fingers 17 arranged side by side and interdigitated with one another.

Figure 13:
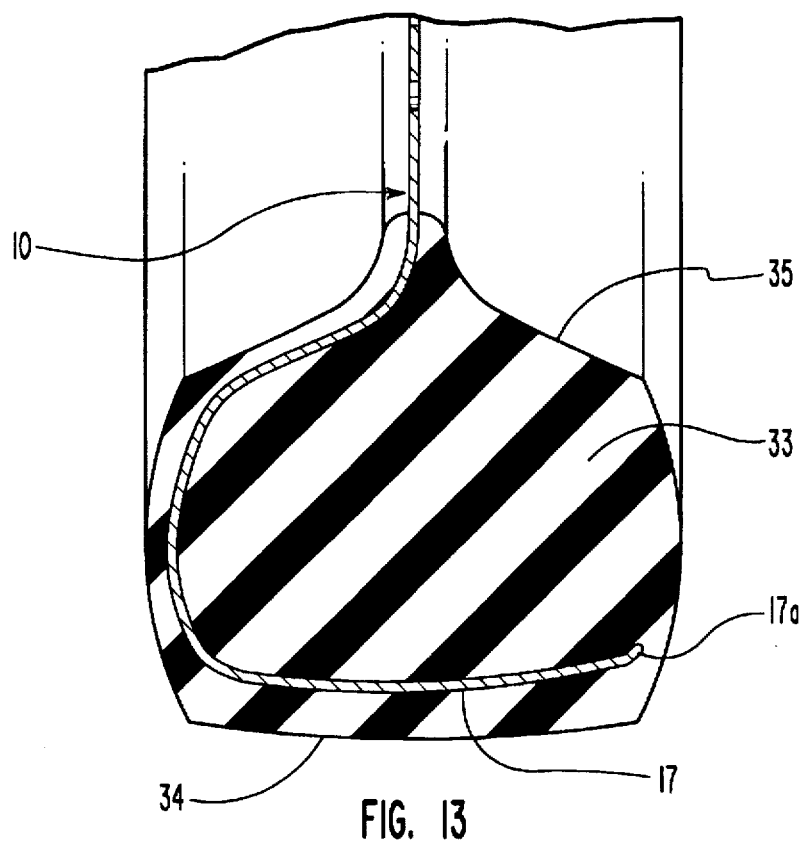
FIG. 13 shows a section of a single anisotropic assembly of the invention molded into a solid section of a composite material.
Figure 14:
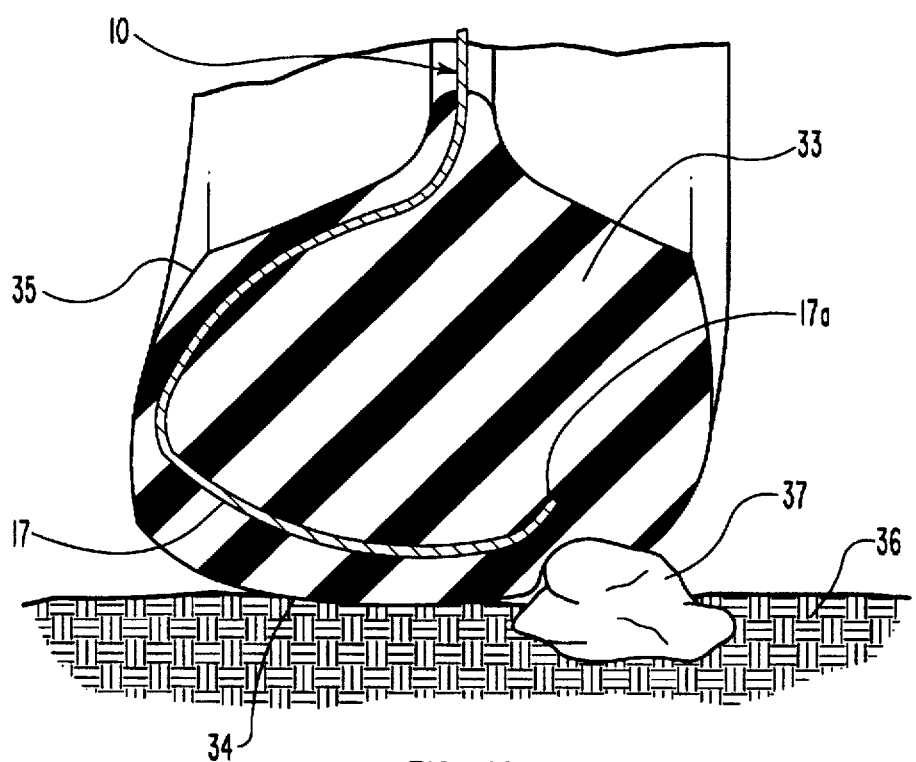
FIG. 14 shows the section of the assembly of FIG. 14 rolling over an obstruction, shown as a stone.

FIG. 13 shows the single anisotropic spring 10 as having been molded or otherwise cast into a composite material 33 to have an elastomeric cap 34 and sides 35, with the spring fingers 17 essentially parallel to the face of cap 34 and are upturned slightly at the finger ends 17a. FIG. 14 shows the wheel of FIG. 13 axially mounted to a vehicle and rolling along roadway 36 contacting a rock 37. In which contact, the wheel elastomeric cap 34 is shown deflected as it travels over the rock, with the finger end 17a bending upwardly. Which finger end will flex outwardly to return to its original attitude after it has rolled over the rock.

Figure 15A:
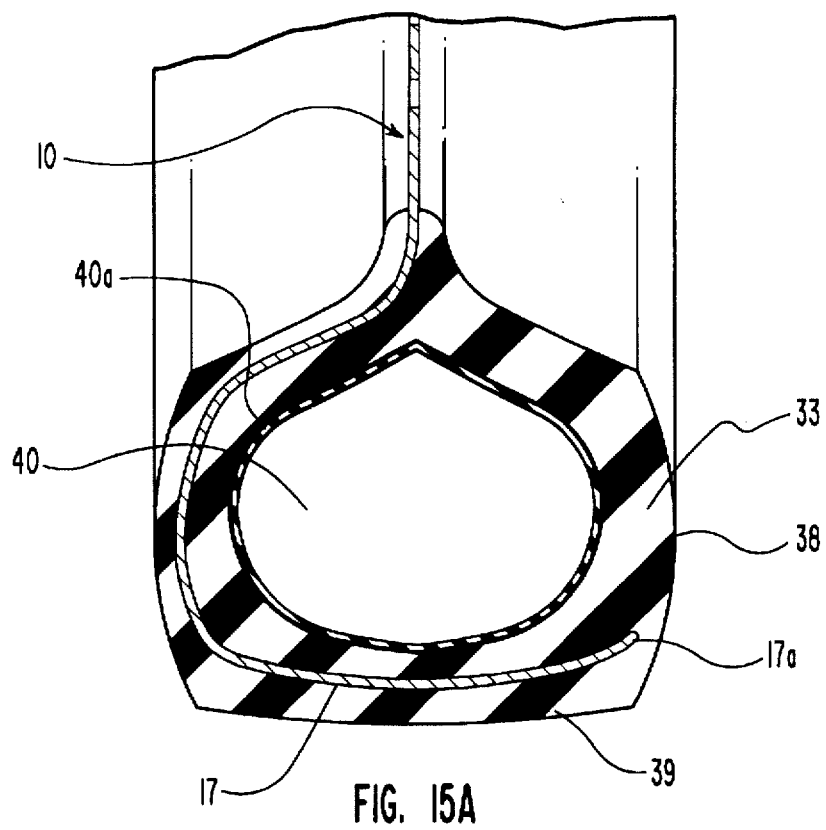
FIG. 15 shows a single anisotropic assembly like that of FIGS. 13 and 14 shown encased in a composite material shell.
Figure 15B:
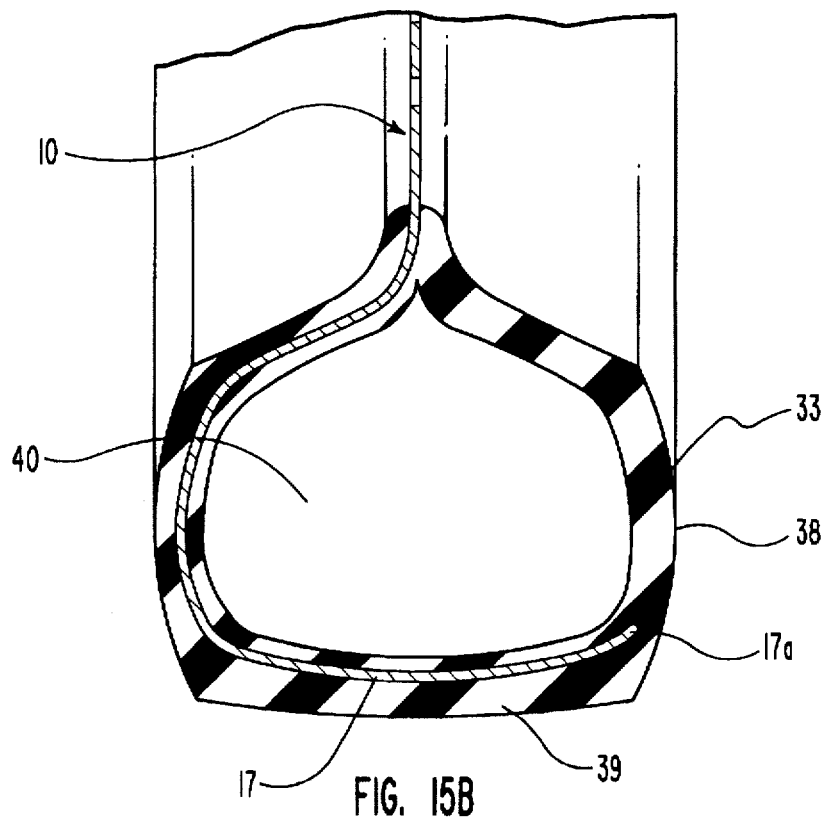

FIG. 15 shows an assembly where a composite 33 applied around a single anisotropic spring 10 is formed into a shell that has a side 38 and elastomeric cap 39 formed over a bladder 40a with an open center cavity 40. Like the assembly of FIGS. 13 and 14, the assembly of FIG. 15 includes the essentially straight fingers that are contained in the elastomeric cap 39 and below the top or outer surface thereof, that can be upturned or downturned on their ends shown at 17a. The assembly of FIG. 15 is for axially mounting onto to support a compressive load thereon as is generated by the weight of a vehicle. The cavity 40 is preferably formed as by pressurizing bladder 40a fitted within the mold with the composite material injected therearound, or in a roto casting process, or other process within the scope of this disclosure and may be equal, greater or less thickness at the side as compared to the elastomeric cap, providing a thin side. Such will not compromise the load being characteristics of the assembly as the compressive forces the wheel experiences are supported at the anisotropic spring 10 and do not act on the side. Also, as for example in a roto casting process, the core can be formed to contain progressively greater diameter and numbers of pours or bubbles from small pours proximate to the cap to the hub, not shown, that are introduced into the composite material as it is spun cast to the single anisotropic spring. Of course, it should be understood, the dual anisotropic spring 30 can be substituted for the single anisotropic spring 10 to form the wheels of FIGS. 13 through 15.

To develop the spring 10 as described herein and shown and discussed with respect to FIG. 18 below, the outstanding distance from the hub 11 to where the elements 23 are bent into fingers 17, that mechanically is an outstanding flange. Stresses at that flange need to be translated through the element to the hub for assembly stability and accordingly the curves shown as radius R1 through radius R4 are selected to transfer the design load therethrough without element buckling. Element strength or critical load for the outstanding flange of the invention is determined, starting from "Roark's Formula's for stress and strain" Hooke's Law says strain is proportional to stress, it does not hold in a case of failure through elastic instability if a slender (evler) column. Evler's Formula:

$$\frac{P}{A} = \frac{C\pi^2 E}{(L/r)^2}$$

$P$ = load
$A$ = area of section
$C$ = coef of elastomer
 = 1 for round ends
 = 4 for fixed ends
 = rarely > 2
$E$ = mod of elasticity
$L/r$ = slenderness ratio
$I$ = moment of inertia and is a function
   of the assembly geometry -continued Outstanding Flange: Long one end fixed one end fire buckling $$\text{stress } \alpha' = \frac{1.09 E\, (t)^2}{1 - v^2(b)}$$

$b$ = width
$t$ = thickness
$E$ = modulus of elasticity
$v$ = poissons ratio
$I$ = moment of inertia and is a function of the assembly geometry $K_1 = 1.464$ when $P_1 = P_2$,
$E_2 I_2 = E_1 I_1$ and $alz = s$ $$P' = \frac{K_1 \pi^2 E_1 I_1}{2}$$

= critical load

A formula for calculating buckling stress, is determined as follow follows:
With, $b$ = width
$t$ = thickness
$E$ = modulus of Elasticity
$v'$ = Poissons ratio $$\alpha' = \frac{1.09\, E\, (t)^2}{1 - v^2(b)}$$

$K_1 = 1.464$, when $P_1 = P_2$, and
$K_2 = .210$ when $P_1$ is not equal to $P_2$
$E_2 I_2 = E_1 I_1$
and $als = s$ $$P_1 = \frac{K \pi^2 E_1 I_1}{2^2}$$

= Critical Load

Theoretical Example

From the above, for determining critical load, $$P' = \frac{K \pi^2 E I}{L^2}$$

$K = 1.464$
$\pi^2 = 9.86965$
$L = 5$
$E = 30 \times 10^6$
$I = 1/12 bd^2 = ht^3/12$
$P = L/BN$ $$EI = \frac{PL^2}{K\pi^2} = \frac{L}{8N} \cdot \frac{L^2}{K\pi^2} = \frac{E\, ht^3}{12}$$

$L12 L^2 = 8NK\pi^2 E h t^3$ $$Nht^3 = \frac{L12 L^2}{8 K\pi^2 E} = \text{const} = \frac{1500}{1.464} \cdot \frac{12}{8} \cdot \frac{25}{9.87} \cdot 30 \times 10^6$$

$$Nht^3 = \frac{45 \times 10^6}{3467.9 \times 10^2} = \frac{4.5}{34679} = .0001297$$

when $t$ = .060, $Nh$ = .60 if $h = .1$, $N = 6, H = 2, N = 3$
     = .080,      = .0025        $N = .025, N = .125$ $$\frac{L}{8N} = \frac{K\pi^2 ET}{L^2} = \frac{K\pi^2 E1 bt^3}{L^2\, 12} = \frac{L}{8N},\ 12 L^2 = 8NK\pi^2 E b t^3$$

Figure 16:
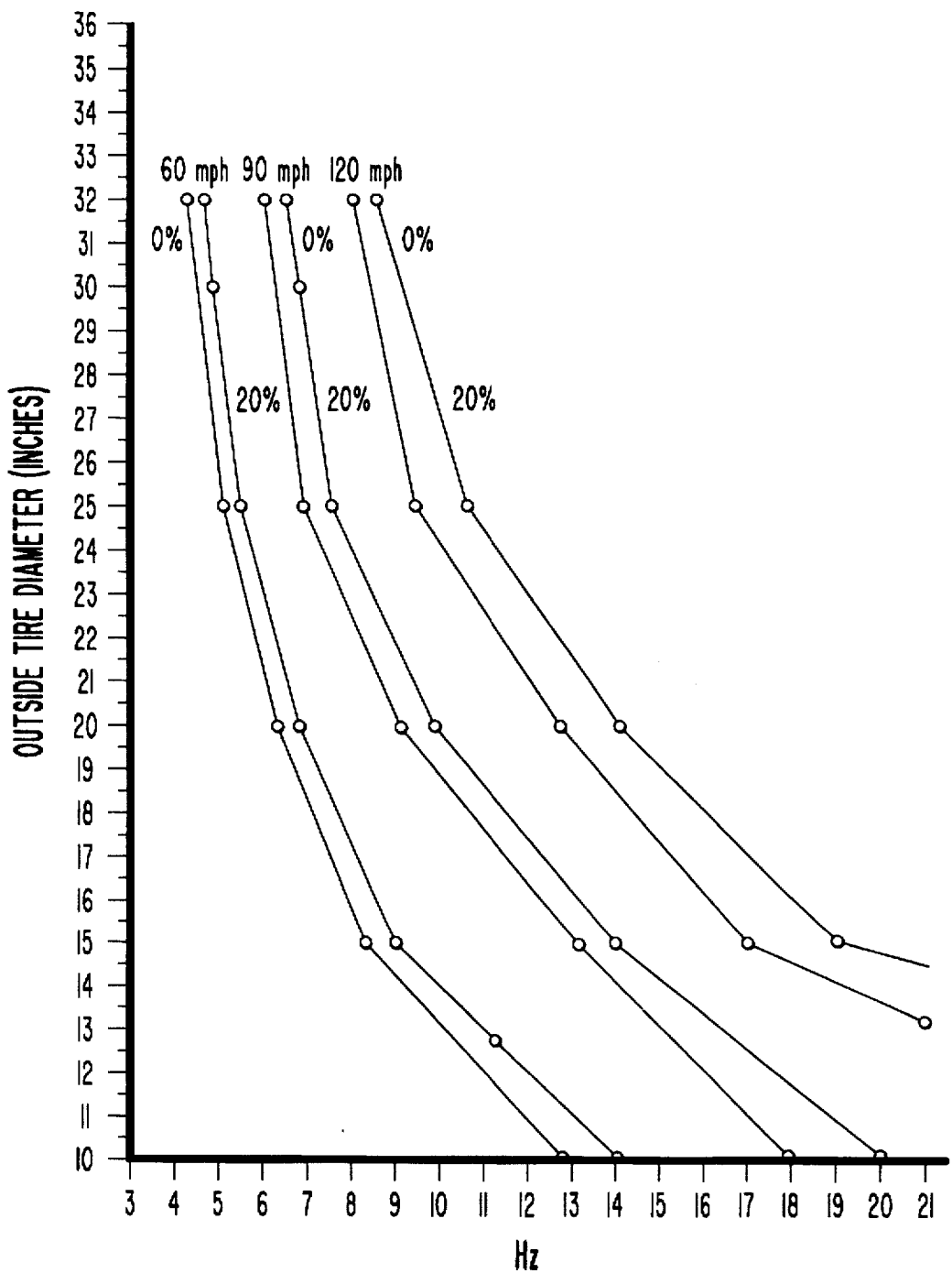
FIG. 16 is a graph of frequency as relating to diameter for different speeds.

FIG. 16 is a graph relating assembly outside diameter to elastomer cap deflection, as measured in percent, for varied speeds of spring turning measured in miles per hour and frequencies in cycles per second (Hz) and at speeds from sixty (60) miles per hour to one hundred twenty (120) miles per hour. The graph is useful for selecting an appropriate composite material as the assembly elastomeric cap alone or the elastomeric cap and side as well as the cap thickness. With such composite material selection, of course, also governed for the compressive load as the wheel is expected to bear.

Figure 17:
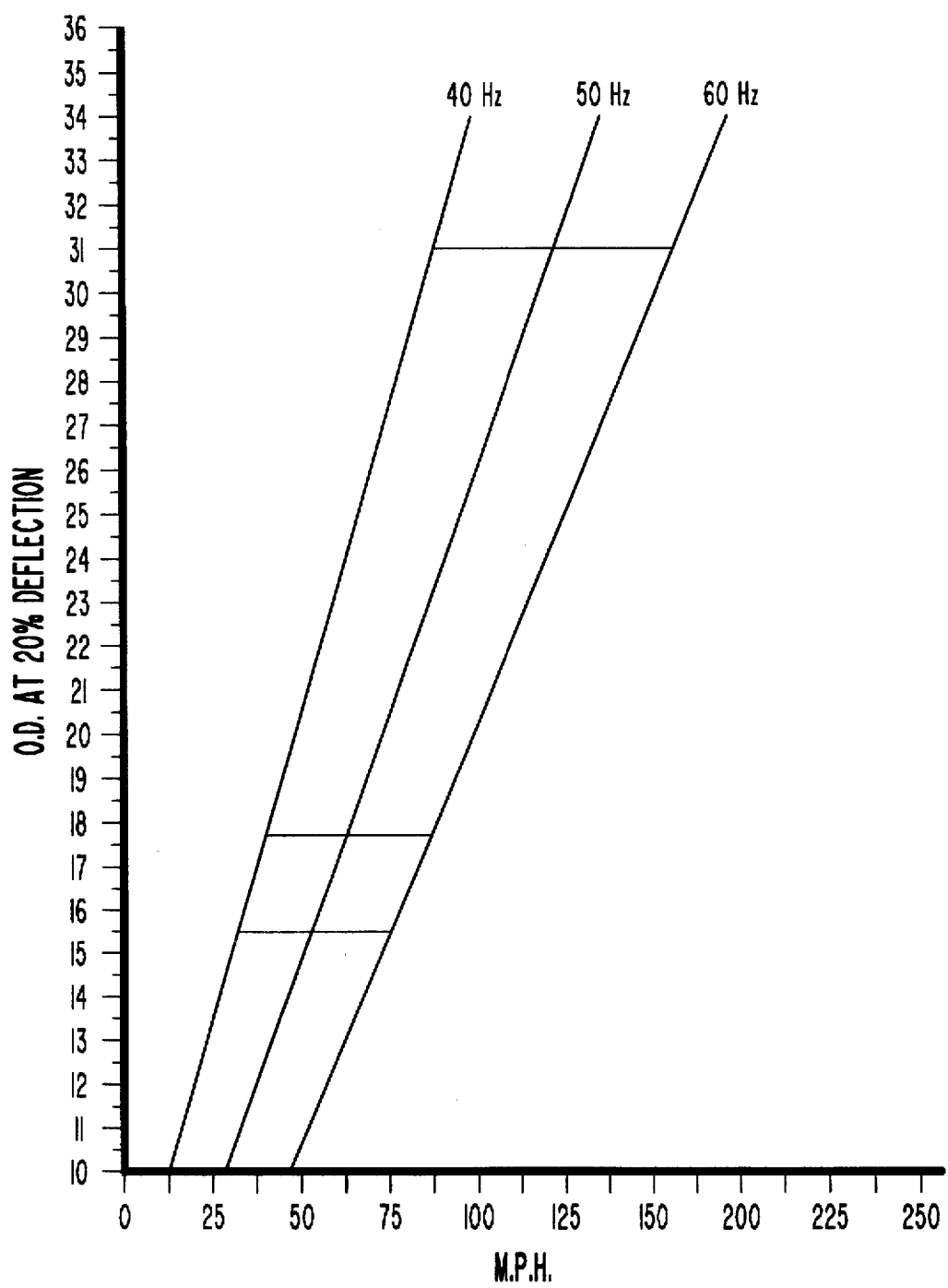
FIG. 17 is a graph of outside diameter deflection at different speeds for different frequencies.

FIG. 17 is a graph of a preferred comfort zone for the design of the spring assembly. The graph compares the assembly diameter versus forward speed at accept frequency ranges in cycles per second (Hz).

FIG. 18 shows an enlarged profile view of a single element of the single anisotropic spring 10 of the invention that includes markings therealong indicating equal segments and showing the radial distance from the edge of the center hole 11 to the outer edge. In practice, for a blank formed from a stiff material that tends to bend when subjected to a compressive load and will return to its original shape when that load is removed, such as a C 1020 steel having a thickness of approximately 0.080 inches has been used. It should be understood, however, that other types of steel and even an aluminum or fiber glass material could be used in the manufacture of springs 10 and 30, as governed by the compressive load a particular spring is intended to support. This type of steel and individual element thickness is appropriate for a spring assembly having a conventional diameter with finger elements that are approximately 0.11 to 0.41 inches in width and will support a compressive load of up to approximately twelve hundred (1200) pounds. In the formation of the elements of the single anisotropic spring, as shown in FIGS. 3 and 4, the element is bent at radiuses R1, R2 and R3, as shown in FIG. 18. Which radiuses provide the required element curvature to translate a compressive load at the fingers 17 through the element and into the wheel hub 11, passing into the connected axle, not shown. For the single anisotropic spring 10, R1 is between one eighth (⅛) of R2 and R2, and R2 is between one half (½) of the spring width and one tenth (1/10) of the spring width, R3 is between one half (½) of the spring diameter and flat or a zero angle to the spring face, and R1 is 2 to 6 more R4. Of course, the dual anisotropic spring 30 is composed of the two anisotropic springs 10 connected at hubs 11 and accordingly the radii R1, R2 and R3 for the pair of anisotropic springs 10 used in spring 30 is the same as set out above.

Figure 19:
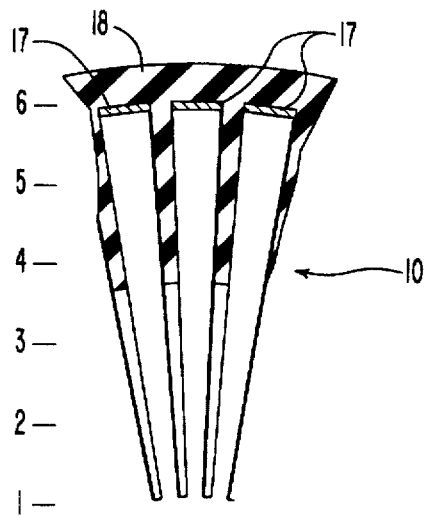
FIG. 19 shows a dimensional relationship of a single anisotropic assembly elements.

FIG. 19 shows a side elevation view of a plurality of single anisotropic springs 10 shown with a elastomeric cap 18 formed across the respective fingers 17 having a thickness of approximately 0.080 inches, and showing a spacing distance of approximately 0.125 inches between the spring elements. This relationship is determined from the following formula that relates to dimensions shown on the spring 10 of FIG. 19:

$$W1 = \frac{OD/2}{OD/2 - OW} = \frac{OD/2}{OD/2 - OW} = W1$$

Shrink = 4% (Bort)

$$\frac{W1}{W} = \frac{OD/20W}{OD/2} = \frac{R - OW}{R}$$

$$W1 = \left( \frac{R - OW}{R} \right)$$

Figure 20:
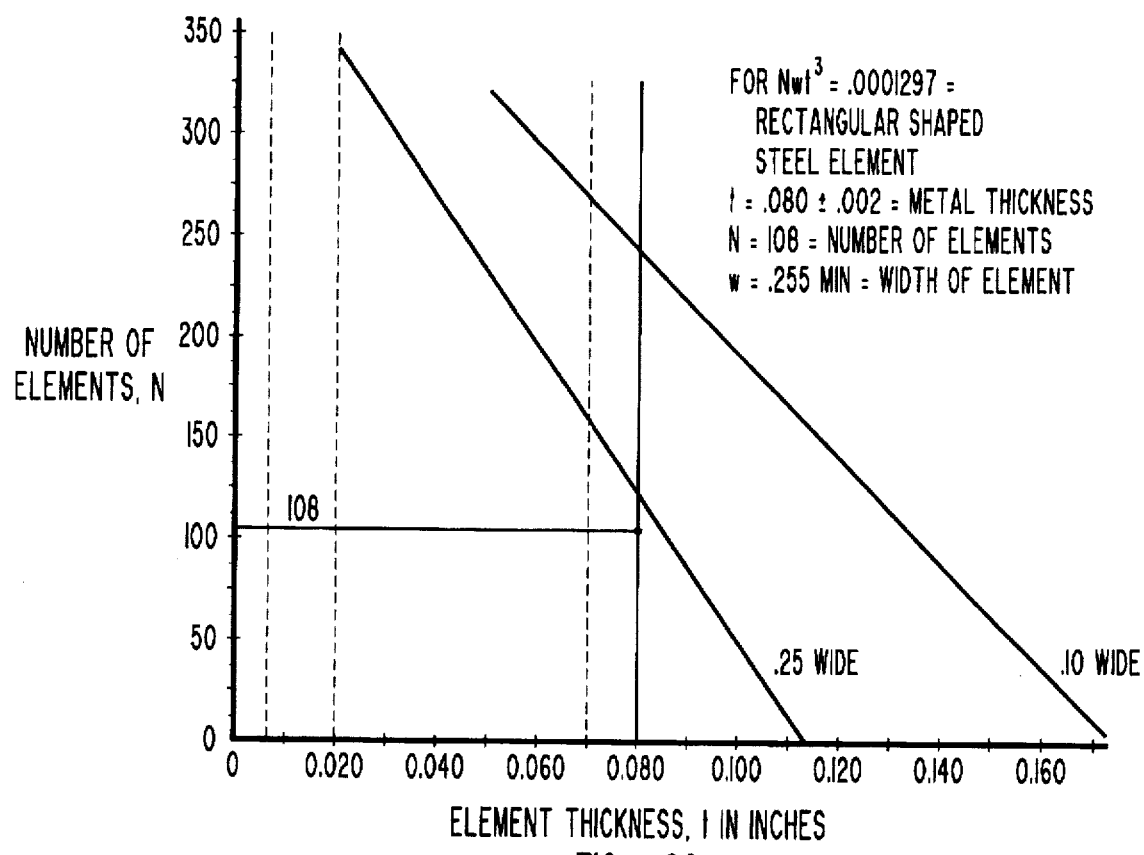
FIG. 20 shows a graph of the relationship of the number of elements versus element thickness.

FIG. 20 shows a graph of an optimum performance window for a single anisotropic spring for element thickness for supporting a compressive load of up to twelve hundred (1200) pounds, and the area between the straight lines of which graph shows the various design element thickness and number as will support the load.

Figure 21:
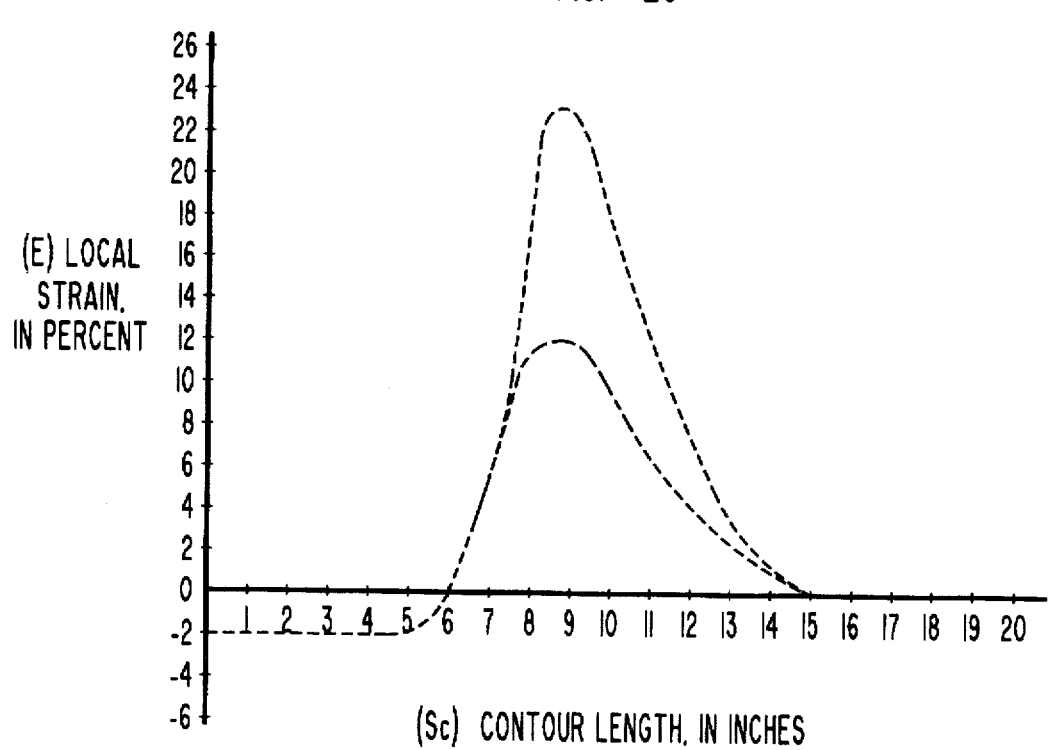
FIG. 21 shows a graph comparing local load strain in percent on contour length in inches for a wheel under compressive stress.

FIG. 21 shows a graph of a typical strain distribution extended on an assembly profile, shown as a loaded strain on a contour of a wheel, comparing local strain on that wheel cap in percent against the contour length in inches and is useful for selection of an appropriate cap for and side elastomeric material for the anticipated contour strain as the wheel experiences under a design load.

The above graphs are useful in the design of the blank and formation thereof into the spring 10, as set out in FIG. 18 and in the discussion relating thereto, and for a selection of an appropriate elastomeric material as the elastomer cap and sides and the configuration thereof for the anticipated compressive stresses, the assembly uses, and the conditions that the assembly will experience during such uses.

While preferred embodiments of single and dual anisotropic springs of the invention have been shown and described herein as components of a combination assembly, as have methods for construction of the spring and assembly, it should, however, be understood that the present disclosure is made by way of example only and that variations to the inventions as described are possible within the scope of this disclosure without departing from the subject matter coming within the scope of the following claims and a reasonable equivalency thereof, which claims I regard as my invention.

I claim:

1. A dynamic steerable wheel spring comprising, a pair of units each individually formed from a single section of a spring steel material having a uniform thickness with said section of spring steel manufactured to have a flat circular center hub having hole means formed therein for axial mounting, and where, from an outer edge of said hub, identical equidistantly spaced segments extend radially outwardly that are each identically bent outwardly from the plane of said hub at identical points therealong and with said elements each sloping outwardly from said plane of said hub, are bent inwardly at identical points therealong towards the plane of said hub, and each element, at a top portion is bent inwardly at a same radius to form segment ends that are each at an identical distance from, the circumference of and cross at right angles to said hub to form a plurality of equal spaced apart fingers; and the hubs of said pair of units are secured together such that the hole means in said hubs are aligned and the fingers of one of each said units interdigitate with and fit alongside to be equally spaced apart from the fingers of the other unit.

2. A dynamic steerable wheel spring as recited in claim 1, wherein the unit is formed from the sheet of a spring steel material as a circular disk having identical slots formed at equal equal spaced intervals inwardly from around said disk outer circumference and radially to the outer circumference of the hub; and the hole means are identical spaced holes formed at equal radial distances from a center of said hub.

3. A dynamic steerable wheel spring as recited in claim 2, wherein the spring steel material is formed by bending into the unit in a single operation.

4. A dynamic steerable wheel spring as recited in claim 2, wherein the thin spring steel material wherefrom the disk is formed of steel types used to produce automative wheels.

5. A dynamic steerable wheel spring as recited in claim 1, wherein the fingers are identical and each has a width of from 0.1 to 0.5 inches.

6. A dynamic steerable wheel spring as recited in claim 1, further including covering each finger with an equal amount and height of an elastomeric cap.

7. A dynamic steerable wheel spring as recited in claim 1, further including fitting a hoop of a non resilient material around to contain the fingers, and encapsulating said fingers and covering hoop in an elastomeric cap.

8. A dynamic steerable wheel spring as recited in claim 1, wherein the joined pair of dynamic steerable springs are encapsulated with an elastomer material covering the fingers and radial segments outwardly from said hub.

9. A dynamic steerable wheel spring as recited in claim 8, wherein the elastomer material is a composite of a polyether urethane elastomeric particle.

10. A dynamic steerable spring comprising a dynamic steerable wheel spring comprising, a unit formed from a single section of a spring steel material having a uniform thickness with said section of spring steel manufactured to have a flat circular center hub having hole means formed therein for axial mounting, and where, from an outer edge of said hub, identical equidistantly spaced segments extend radially outwardly that are each identically bent outwardly from the plane of said hub at identical points therealong and with said elements each sloping outwardly from said plane of said hub, are bent inwardly at identical points therealong towards the plane of said hub, and each element, at a top portion is bent inwardly at a same radius to form segment ends that are each at an identical distance from the circumference of and cross and are at right angles to said hub to form a plurality of equal spaced apart fingers; and a first hoop of a non resilient material is positioned within and adjacent to a circle formed by said fingers; and said fingers and hoops are encapsulated in an elastomeric cap.

11. A dynamic steerable wheel spring as recited in claim 10, further including fitting a hoop of a non resilient material around to contain the fingers; and encapsulating said fingers and covering hoop in an elastomeric cap.

12. A dynamic steerable wheel spring as recited in claim 10, wherein the unit is formed from the sheet of a spring steel material as a circular disk having identical slots formed at equal equal spaced intervals inwardly from around said disk outer circumference and radially to the outer circumference of the hub; and the hole means are identical spaced holes formed at equal radial distances from a center of said hub.

13. A dynamic steerable wheel spring as recited in claim 12, wherein the spring steel material is formed by bending into the unit in a single operation.

14. A dynamic steerable wheel spring as recited in claim 10, wherein the fingers are identical and each has a width of from 0.1 to 0.5 inches.

15. A dynamic steerable spring as recited in claim 10, further including the hubs of two units are secured together such that the hole means in each said hub are aligned and the fingers of one of said unit interdigitate with and are alongside the fingers of the other unit.

16. A dynamic steerable wheel spring comprising a dynamic steerable wheel spring comprising a unit formed from a single section of a spring steel material having a uniform thickness with said section of spring steel manufactured to have a flat circular center hub having hole means formed therein for axial mounting, and where, from an outer edge of said hub, identical equidistantly spaced segments extend radially outwardly that are each identically bent outwardly from the plane of said hub at identical points therealong and with said elements each sloping outwardly from said plane of said hub, are bent inwardly at identical points therealong towards the plane of said hub, and each element, at a top portion is bent inwardly at a same radius to form segment ends that are each at an identical distance from the circumference of and cross and are at right angles to said hub to form a plurality of equal spaced apart fingers; and the segments and fingers are encapsulated in an elastomer to form elastomeric cap over said fingers as a tread and to cover said segments from the hub outwardly as an elastomeric side.

17. A dynamic steerable wheel spring as recited in claim 16, wherein the elastomer is formed over the fingers and segments so as to leave a cavity beneath said fingers.

18. A dynamic steerable wheel spring as recited in claim 16, wherein the elastomer material is a composite of a polyether urethane and elastomeric particles.

19. A dynamic steerable spring as recited in claim 16, further including the hubs of two units are secured together such that the hole means in each said hub are aligned and the fingers of one of said unit interdigitate with and are alongside the fingers of the other unit.

20. A dynamic steerable wheel spring as recited in claim 16, wherein the unit is formed from the sheet of a spring steel material as a circular disk having identical slots formed at equal equal spaced intervals inwardly from around said disk outer circumference and radially to the outer circumference of the hub; and the hole means are identical spaced holes formed at equal radial distances from a center of said hub.

21. A dynamic steerable wheel spring as recited in claim 16, wherein the spring steel material is formed by bending into the unit in a single operation.

22. A dynamic steerable wheel spring as recited in claim 16, wherein the spring steel material wherefrom the disk is formed of steel types used to produce automotive wheels.

23. A dynamic steerable wheel spring as recited in claim 16, wherein the fingers are identical and each has a width of from 0.1 to 0.5 inches.

24. A dynamic steerable wheel spring as recited in claim 16, further including covering each finger with an equal amount and height of an elastomeric cap.

25. A dynamic steerable wheel spring as recited in claim 16, further including fitting a hoop of a non resilient material around to contain the fingers; and encapsulating said fingers and covering hoop in an elastomeric cap.

26. A dynamic steerable wheel spring as recited in claim 16 further including a first hoop of a non resilient material is positioned within and adjacent to a circle formed by the fingers; and said fingers and hoops are encapsulated in an elastomeric cap.

* * * * *